United States Patent
Vivekanandan

(10) Patent No.: US 6,584,324 B1
(45) Date of Patent: Jun. 24, 2003

(54) METHOD FOR DYNAMICALLY ASSOCIATING ANNOUNCEMENT GROUPS WITH TALKGROUPS IN A RADIO COMMUNICATION SYSTEM

(75) Inventor: Janahan Vivekanandan, Buffalo Grove, IL (US)

(73) Assignee: Motorola, Inc., Schaumburg, IL (US)

(*) Notice: Subject to any disclaimer, the term of this patent is extended or adjusted under 35 U.S.C. 154(b) by 610 days.

(21) Appl. No.: 09/587,840

(22) Filed: Jun. 6, 2000

(51) Int. Cl.[7] ................................................. H04B 7/00
(52) U.S. Cl. ........................ 455/519; 455/518; 455/520
(58) Field of Search ................................. 455/518, 519, 455/520, 414, 422, 432, 436, 426

(56) References Cited

U.S. PATENT DOCUMENTS

| | | | | |
|---|---|---|---|---|
| 5,471,646 A | * | 11/1995 | Schultz | 455/519 |
| 5,790,956 A | * | 8/1998 | Lo et al. | 455/512 |
| 5,933,780 A | * | 8/1999 | Connor et al. | 455/519 |
| 6,253,091 B1 | * | 6/2001 | Naddell et al. | 455/519 |
| 6,385,461 B1 | * | 5/2002 | Raith | 455/518 |
| 6,477,149 B1 | * | 11/2002 | Okanoue | 370/312 |

* cited by examiner

Primary Examiner—Nay Maung
Assistant Examiner—Alan T. Gantt
(74) Attorney, Agent, or Firm—Steven R. Santema

(57) ABSTRACT

A radio communication system (100) has talkgroups or working groups that intercommunicate with each other on broadcast calls. Multiple working groups are associated with an announcement group. A subscriber unit (112*a–f*) may monitor talkgroup communications or announcement group communications. When communications to a talkgroup are initiated, a grant message (300) is sent to subscriber units affiliated with the talkgroup. A new grant message (350) is generated for subscriber units affiliated with the announcement group. The new grant message relieves subscriber units from storing an association between talkgroups and announcement groups, thereby allowing the association of announcement groups and talkgroups to be assigned dynamically.

16 Claims, 3 Drawing Sheets

METHOD FOR DYNAMICALLY ASSOCIATING ANNOUNCEMENT GROUPS WITH TALKGROUPS IN A RADIO COMMUNICATION SYSTEM

FIELD OF THE INVENTION

The present invention relates generally to wide-area radio communication systems, and in particular, to a method for dynamically associating talkgroup communications with an announcement group in a wide area radio communication system.

BACKGROUND OF THE INVENTION

Wide area dispatch radio communication systems are known. Commercial exemplars of these systems include the SMARTZONE and OMNILINK systems from Motorola Inc., Schaumburg, Ill. In these systems multiple radio base sites are geographically distributed over a wide area to provide over-the-air communications for subscriber radio units travelling in the area. The multiple radio base sites are trunked to a zone controller that performs call control and mobility management for radios and talkgroups on the system. A zone manager is coupled to the zone controller in the system to configure system parameters, physical device configuration, and radio and talkgroup attributes.

In existing wide area dispatch systems, subscriber units are grouped for intercommunication. Talkgroups are groupings of subscriber units that wish to intercommunicate. For example, the fire department of a municipality uses a talkgroup for communication between all members of the fire department. Similarly the police department uses another talkgroup for communication among the members of the department. Another grouping is an announcement group. The announcement group consists of select talkgroups. For example, an announcement group consisting of both the police department talkgroup and the fire department talkgroup accommodates announcements that may apply to both talkgroups.

Traditionally, the association of talkgroups to announcement groups is programmed in the subscriber unit as well as the zone manager and zone controller. In other words, a subscriber unit knows which talkgroups are affiliated with announcement groups. In this manner a subscriber unit, by reviewing the talkgroup associated with a communication determines whether the subscriber unit should participate in the communication because of affiliation with the talkgroup or the announcement group. Since the subscriber unit knows which talkgroups are associated with an announcement group, the announcement group need not be transmitted as a part of each talkgroup communication. If the subscriber unit is set to listen to an announcement group, then the subscriber unit monitors all talkgroup communications associated with the announcement group using the internally stored association between talkgroups and announcement groups. The zone controller uses the stored association of talkgroups to announcement groups to ensure talkgroup and announcement group communications are directed to the correct radio sites based on the radios registered at those sites. This system assumes a static relationship between talkgroups and announcement groups and to some extent a static assignment of talkgroup identification, that is, the actual digital identification sent in a communication and used by a subscriber unit to determine if the communication is directed to it.

Recent standards proposals for wide-area radio communication systems, such as the Association of Public Safety Communications Officers (APCO) Project 25, propose a dynamic allocation of working group or talkgroup identifications. That is, the actual digital data sent with a communication is assigned to a particular talkgroup, rather than having certain digital data always represent the same talkgroup. Since the talkgroup identifications, which are sent in communications for selective reception by subscriber units, are dynamically determined, it is not feasible to statically store in a subscriber unit a predetermined association of talkgroup identifications to announcement groups. This creates a problem for a system that relies on a subscriber unit to use a stored association of announcement groups to talkgroups for monitoring announcement group communications.

Therefore a need exists for a method for a subscriber unit to dynamically associate communications with an announcement group or talkgroup.

DETAILED DESCRIPTION OF THE PREFERRED EMBODIMENTS

In summary, a radio communication system in accordance with the present invention permits talkgroup communications to be associated with announcement groups. More specifically, when a request for a talkgroup call is received by the radio communication system, two grants are issued in response to the request. The grants alert subscriber units affiliated with the call of the communication resources, such as frequencies, to be used in the call. The first grant identifies the talkgroup associated with the call.

The second grant identifies an announcement group associated with the talkgroup identified in the first grant. Subscriber units that are directly affiliated with the talkgroup respond to the first grant in order to receive communications associated with the call. Subscriber units affiliated with the announcement group respond to the second grant to receive communications associated with the call. Since grants associated with an announcement group are explicitly made in the radio communication system, subscriber units are not required to store an association between talkgroups and announcement groups. This advantageously allows for the association of talkgroups to announcement groups to change dynamically.

Figure 1:
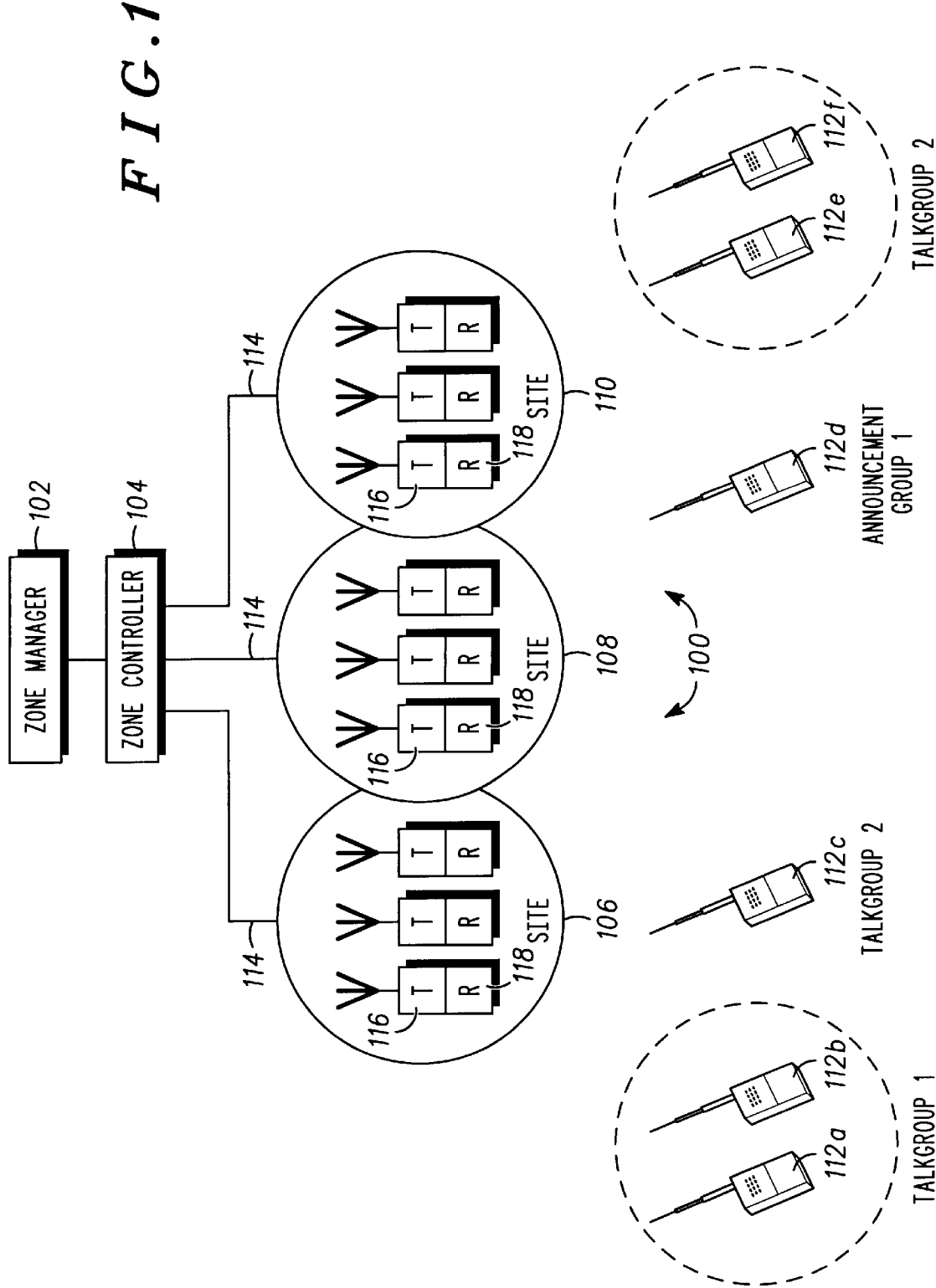
FIG. 1 is a block diagram of a radio communication system in accordance with the present invention.

FIG. 1 is a block diagram of a radio communication system 100 in accordance with the present invention. System 100 includes a zone manager 102, a zone controller 104, radio base sites 106, 108, 110 and a plurality of subscriber units 112a–f. Zone manager 102 configures system parameters, physical device configuration, and radio and talkgroup attributes, including the association of talkgroups with announcement groups. Zone controller 104 performs call control and mobility management for radios and talkgroups on the system. Zone manager 102 is coupled to zone controller 104 for communication of configuration and control between the two. Zone controller 104 is coupled to a plurality of sites 106, 108, 110 via communication trunks 114. In accordance with the present invention, zone controller 104 issues announcement group and talkgroup grant messages for over-the-air communication to subscriber units affiliated with the groups.

Zone manager 102 is a processor-based apparatus that is responsible for configuration of system parameters such as physical device configuration parameters and radio and talkgroup attributes. Zone manager 102 includes an interface for a user or system manager to monitor and configure the system. In particular, a system manager inputs an association between talkgroups and announcement groups. Zone manger 102 communicates the association of talkgroups to announcement groups to zone controller 104.

Zone controller 104 is a processor-based switch that performs call control and mobility management for subscriber unit radios and talkgroups on the system. Zone controller 104 stores the correlation of talkgroups to announcement groups. Though only one zone controller is shown in FIG. 1, multiple zone controllers are alternatively coupled to zone manager 102.

Sites 106, 108, 110 provide the over-the-air interface to subscriber units 112a–f. Sites 106,108, 110 include transmitters 116 and receivers 118 for over-the-air communication with subscriber units 112a–f. Sites 106, 108, 110 are preferably geographically disbursed. Though three sites are shown in FIG. 1, the number of sites is not so limited. In some cases, system 100 covers a statewide area. Subscriber units 112a–f are radios for audio and or data communications. Subscriber units 112a–f travel throughout the geographical area covered by system 100. Typically, subscriber units 112a–f register at a radio site, such as sites 106, 108,110 for communication via the site.

Subscriber units 112a–f are capable of making 1) individual calls on the system from one subscriber to another subscriber; 2) talkgroup calls, which are broadcast to all subscriber units affiliated with a talkgroup; 3) announcement group calls, which are broadcast to all subscriber units affiliated with an announcement group; or 4) telephone interconnect calls, which require zone controller 104 to interconnect with the public switched telephone network through an interface (not shown). As an exemplary grouping, in FIG. 1, subscriber units 112a and 112b are shown affiliated with talkgroup 1. Subscriber units 112c, 112e and 112f are affiliated with talkgroup 2. Talkgroup 1 and talkgroup 2 are associated with the same announcement group, announcement group 1. Subscriber unit 112d is affiliated with announcement group 1. In accordance with the present invention, the association of talkgroups with announcement groups is not stored in the subscriber units 112a–f.

Figure 2:
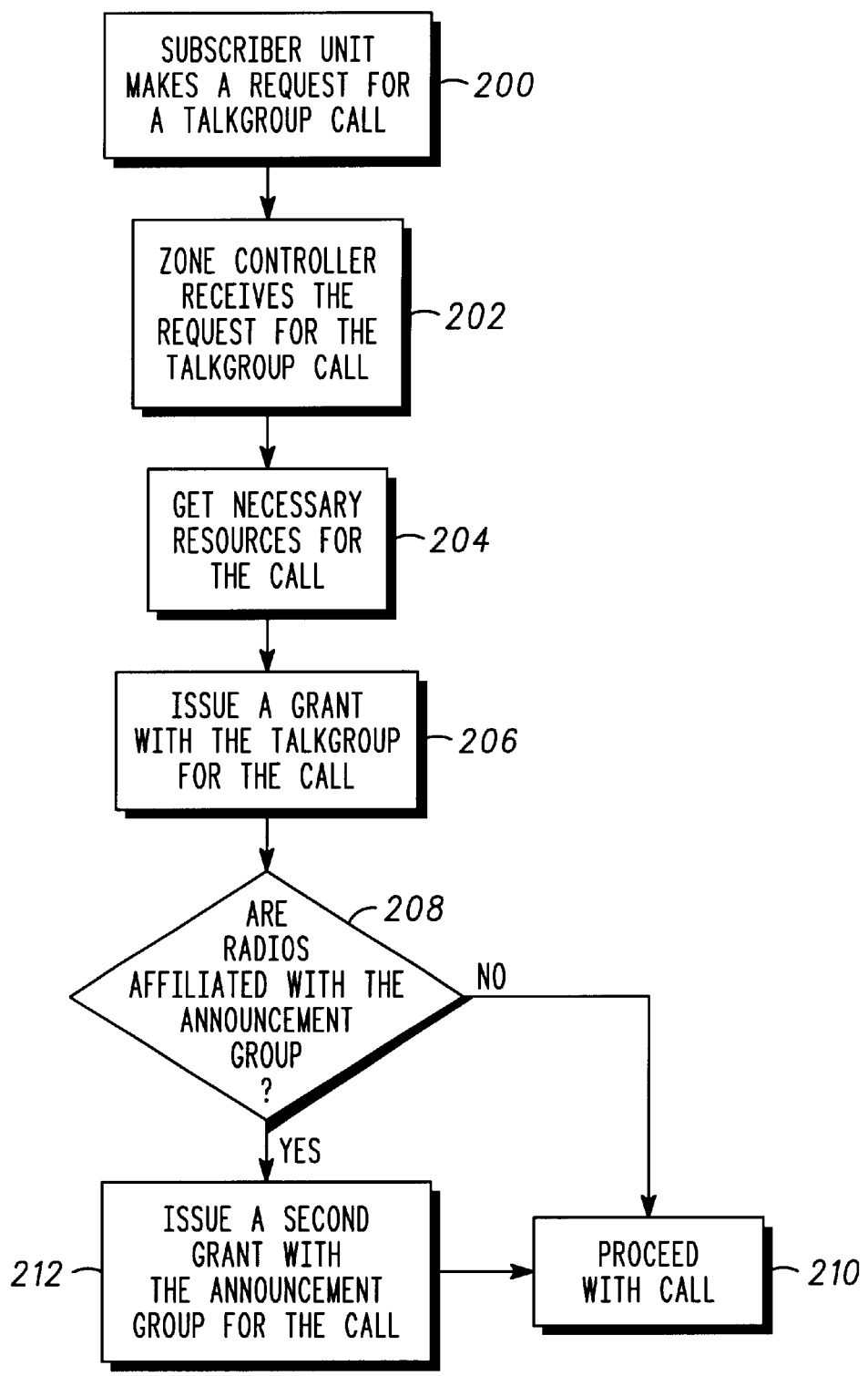
FIG. 2 is a flow chart illustrating a method for associating talkgroup communications with announcement group communications in a radio communication system in accordance with the present invention.

FIG. 2 is a flow chart illustrating a method for dynamically associating talkgroup communications with announcement groups in accordance with the present invention. The flow chart is described below with reference to the embodiment of the invention shown in FIG. 1.

First, a subscriber unit makes a request for a talkgroup call (200). The request is typically initiated with a push-to-talk request from a subscriber unit. For example, subscriber unit 112c issues a push-to-talk request for its affiliated talkgroup 2. This request is transmitted over the air from the subscriber unit to its associated site, in this case site 106. Zone controller 104 receives the request from site 106 for the talkgroup call (202). In response to the request for the talkgroup call, the zone controller gets the appropriate resources necessary for the call (204). More specifically, zone controller 104 determines available frequencies at the sites that are involved in the call for the transmission and receipt of audio communications associated with the call. For example, transmit and receive channels are set up for the talkgroup call requested by subscriber unit 112c at site 106, site 108 and site 110. Subscriber units 112e and 112f, which are affiliated with talkgroup 2 and registered to site 110, are allocated resources at site 110 for the call. Similarly, resources are allocated at site 108 for subscriber unit 112d, which is affiliated with announcement group 1 and registered at site 108. Resources are allocated for subscriber unit 112d since announcement group 1 includes talkgroup 2.

Once the resources necessary for the call are allocated (204), a first grant is issued for the talkgroup call (206). The grant indicates to the subscriber units associated with the call, the resources that are allocated for the call. The subscriber units use the information in the grant message to monitor the allocated resources for communications associated with the call. The grants are transmitted by zone controller 104 to the sites involved in the call for over-the-air communication from the sites to the subscriber units. In the example talkgroup call from subscriber unit 112c, grants are transmitted to sites 106,110 for subscriber units 112c, 112e and 112f.

Figure 3:
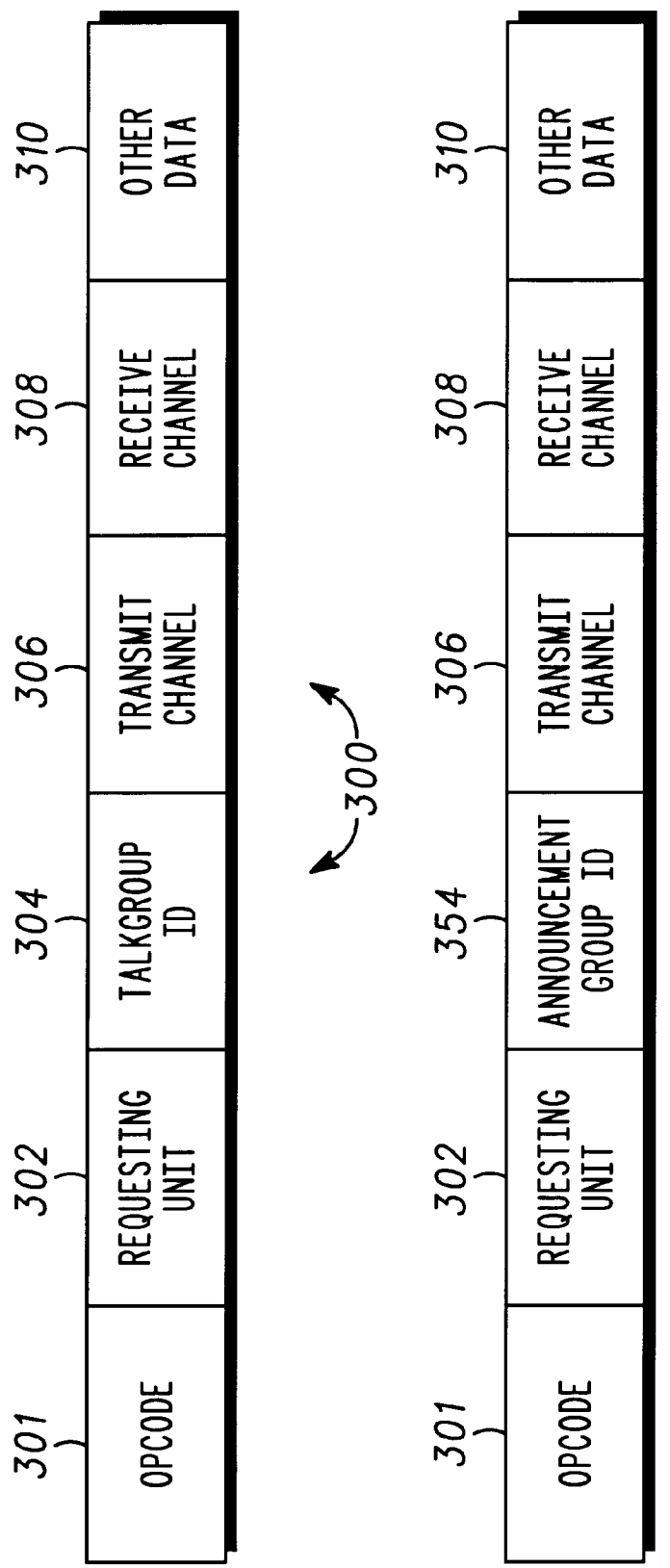
FIG. 3 is a diagram illustrating the layout of grant messages in accordance with the present invention.

An exemplary grant message 300 is shown in FIG. 3. The message 300 includes an opcode field 301, a requesting unit field 302, a talkgroup ID field 304, a transmit channel field 306, a receive channel field 308, and an other data field 310. The opcode field 301 identifies the type of message, in this case, a grant message. The requesting unit field 302 contains data to identify the subscriber unit requesting or initiating the call. The talkgroup ID field 304 includes digital data indicating the talkgroup involved in the call. The transmit channel field 306 and receive channel field 308 contain indications for the transmit channel frequency and receive channel frequency, respectively, for the communication. The other data field 310 includes other data necessary for the communication, such as identification of any encryption to be used.

Continuing with the example of a request from subscriber unit 112c for a talkgroup called to talkgroup 2, the grant message indicates subscriber unit 112c as the requesting unit, talkgroup 2 as the talkgroup ID, and the designated transmit and receive channels for the communication. In response to receiving the grant, the subscriber units associated with talkgroup 2 are alerted to a pending communication for talkgroup 2. In particular, subscriber units 112e, 112f, which are affiliated with talkgroup 2, receive a grant and take appropriate action to prepare for communications over the indicated receive and transmit channels.

After issuing the talkgroup grant (206), the zone controller determines if there are radios or subscriber units affiliated with the announcement group that the talkgroup call is associated with (206). In other words, zone controller 104 determines the announcement group, if any, that is associated with the requested talkgroup call. Zone controller 104 stores the association of talkgroups to announcement groups. Most preferably, each talkgroup is associated with one announcement group. The association is entered and reconfigured by a system manager using zone manager 102.

If there are no radios affiliated with the announcement group (208), then the call proceeds in the normal manner (210). On the other hand, in accordance with the present invention, if there are subscriber units registered to the radio communication system that are affiliated with the announcement group (208), then a second grant is issued by the zone controller (212). The second grant is used to alert radios affiliated with the announcement group that they should participate in the communication. In particular, since a subscriber unit does not and need not store the association between talkgroups and announcement groups, a subscriber unit does not know whether a talkgroup call is associated with an announcement group it is affiliated with. In the example, subscriber unit 112d, which is affiliated with announcement group 1, does not store an indication that communications to talkgroup 2 are affiliated with the announcement group 1.

An exemplary second grant message 350 to the announcement group is shown in FIG. 3. This second grant message 350 is similar to message 300. In particular, the contents of the transmit channel field 306 and the receive channel field 308 are the same as the corresponding fields of grant message 300, since the same resources are used. Also, the contents of the requesting unit field 302 identify the same initiator of the call identified in the requesting unit field 302 of grant message 300. An announcement group ID field 354 replaces the talkgroup ID field 304. A subscriber unit affiliated with an announcement group monitors the announcement group ID field to determine if the communication is for the subscriber unit. Preferably, second grant message 350 includes a predetermined opcode in opcode field 301 to identify the second grant message 350. Most preferably, the opcode for the second grant message 350 is different from the opcode for grant message 300 to prevent subscriber units affiliated with a talkgroup, rather than the announcement group, from responding to the second grant message 350.

Following with the example, after the second grant, subscriber unit 112d is alerted that there will be a communication on the indicated transmit channel and receive channels for the subscriber unit. After the second grant is issued (212), the call proceeds in the normal manner (210). That is, the subscriber units affiliated with either the talkgroup or announcement group participate in the call. In this manner, a subscriber unit need only know which announcement group it is currently affiliated with in order to receive communications for the announcement group. In contrast to the prior art, the subscriber unit need not store a list of talkgroups associated with each announcement group.

By virtue of the method described above, a subscriber unit in a radio communication system determines whether a talkgroup communication is for an affiliated announcement group without having a stored association of talkgroups to announcement groups. Advantageously, the association of announcement groups to talkgroups is dynamically changed in a radio communication system without the need to modify subscriber units individually. A new grant message is required in the system to alert subscriber units affiliated with an announcement group of a communication to the announcement group. The additional grant is used only when required.

Whereas the present invention has been described with respect to specific embodiments thereof, it will be understood that various changes and modifications will be suggested to one skilled in the art and it is intended that the invention encompass such changes and modifications as fall within the scope of the appended claims.

What is claimed is:

1. A method for alerting a subscriber unit to group communications in a radio communication system, wherein the radio communication system has a first talkgroup and a second talkgroup and the first talkgroup and the second talkgroup are associated with a first announcement group and wherein calls directed to the first talkgroup or the second talkgroup are to be received by subscriber units associated with the first announcement group, the method comprising the steps of:

A) making a request for a call to a one of the first talkgroup or the second talkgroup;

B) receiving the request for the call;

C) issuing a first grant for the request, the first grant identifying the one of the first talkgroup or the second talkgroup; and D) issuing a second grant for the request, the second grant identifying the first announcement group.

2. The method of claim 1 further comprising the step of:

E) a subscriber unit affiliated with the one of the first talkgroup or the second talkgroup responding to the first grant to receive communications associated with the call.

3. The method of claim 1 further comprising the step of:

E) a subscriber unit affiliated with the first announcement group responding to the second grant to receive communications associated with the call.

4. The method of claim 1 wherein the first grant identifies an initiator of the request.

5. The method of claim 1 wherein the first grant identifies a transmit channel and a receive channel for the call.

6. The method of claim 5 wherein the second grant identifies the transmit channel and the receive channel for the call.

7. The method of claim 1 wherein the second grant identifies an initiator of the request.

8. The method of claim 1 wherein the second grant identifies a transmit channel and a receive channel for the call.

9. A method for alerting a subscriber unit to group communications in a radio communication system comprising the steps of:

A) receiving a request for a call to a one of a plurality of talkgroups, wherein each talkgroup of the plurality of talkgroups is associated with an announcement group of a plurality of announcement groups;

B) issuing a first grant for the request, the first grant identifying the one of the plurality of talkgroups; and C) issuing a second grant for the request, the second grant identifying a select announcement group associated with the one of the plurality of talkgroups.

10. The method of claim 9 further comprising the step of:

D) a subscriber unit affiliated with the one of the plurality of talkgroups responding to the first grant to receive communications associated with the call.

11. The method of claim 9 further comprising the step of:

D) a subscriber unit affiliated with the select announcement group associated with the one of the plurality of talkgroups responding to the second grant to receive communications associated with the call.

12. The method of claim 9 wherein the first grant identifies an initiator of the request.

13. The method of claim 9 wherein the first grant identifies a transmit channel and a receive channel for the call.

14. The method of claim 13 wherein the second grant identifies the transmit channel and the receive channel for the call.

15. The method of claim 9 wherein the second grant identifies an initiator of the request.

16. The method of claim 9 wherein the second grant identifies a transmit channel and a receive channel for the call.

* * * * *